US006602917B1

(12) United States Patent

Leal Calderon et al.

(10) Patent No.: US 6,602,917 B1

(45) Date of Patent: *Aug. 5, 2003

(54) METHOD FOR PREPARING CONCENTRATED AND EMULSIONS CALIBRATED IN A HIGHLY VISCOUS PHASE, IN PARTICULAR BITUMEN EMULSIONS

(75) Inventors: Fernando Leal Calderon, La Brede (FR); Jerôme Bibette, Bordeaux (FR); Florence Guimberteau, Montusson (FR)

(73) Assignee: Centre National de la Recherche Scientifique (C.N.R.S.), Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/463,595

(22) PCT Filed: Jul. 28, 1998

(86) PCT No.: PCT/FR98/01674

§ 371 (c)(1), (2), (4) Date: Jan. 28, 2000

(87) PCT Pub. No.: WO99/06139

PCT Pub. Date: Feb. 11, 1999

(30) Foreign Application Priority Data

Jul. 29, 1997 (FR) ........................................... 97 09654

(51) Int. Cl.$^7$ ........................... B01F 3/10; B01F 17/18; C08L 95/00; C09D 195/00

(52) U.S. Cl. ........................... 516/43; 106/277; 516/38; 516/928

(58) Field of Search ........................... 516/38, 43, 928; 106/277

(56) References Cited

U.S. PATENT DOCUMENTS

| | | | | | |
|---|---|---|---|---|---|
| 3,036,015 | A | * | 5/1962 | Woodward | 106/277 X |
| 3,220,453 | A | * | 11/1965 | Borgfeldt | 516/43 |
| 3,577,249 | A | * | 5/1971 | Dybalski | 106/277 X |
| 3,740,344 | A | * | 6/1973 | Ferm | 106/277 X |
| 4,623,551 | A | | 11/1986 | Giddey et al. | 426/564 |
| 5,556,574 | A | * | 9/1996 | Rivas et al. | 516/43 |
| 6,113,659 | A | * | 9/2000 | Logaraj et al. | 516/928 X |

FOREIGN PATENT DOCUMENTS

| | | |
|---|---|---|
| EP | 0156486 | 10/1985 |
| EP | 0328118 | 8/1989 |
| WO | WO9637660 | 11/1996 |

* cited by examiner

*Primary Examiner*—Richard D. Lovering

(74) *Attorney, Agent, or Firm*—Jacobson Holman PLLC

(57) ABSTRACT

A process provides a stable emulsion, in particularly a stable, concentrated bitumen emulsion, by emulsifying a first hydrophobic or hydrophilic phase having a viscosity between 1 and 5000 Pa.s with a second phase immiscible in the first phase, in the presence of at least one surfactant, by mixing together the first phase, second phase, and surfactant under a laminar shear regime.

22 Claims, 8 Drawing Sheets

METHOD FOR PREPARING CONCENTRATED AND EMULSIONS CALIBRATED IN A HIGHLY VISCOUS PHASE, IN PARTICULAR BITUMEN EMULSIONS

This application is a 371 of PCT/FR 98/01674 filed Jul. 28, 1998.

The present invention relates to a process for emulsifying a viscous hydrophobic or hydrophilic phase, which is useful in particular for preparing concentrated and calibrated bitumen emulsions, and also relates to the emulsions thus obtained.

Emulsions concentrated in highly viscous hydrophobic compound(s) are used in particular in the surfacings sector, such as, for example, in the road industry. The reason for this is that emulsions represent an attractive alternative to the problem of spreading bitumen on road surfaces. In the traditional technique, the pure bitumen is used hot, which works out to be expensive and can be hazardous for the worksite personnel. When the bitumen is emulsified in water, the material obtained is entirely fluid at room temperature, thus allowing it to be used without difficulty. Under the effect of the evaporation and drainage of the water, a homogenous bitumen film is obtained after a few hours. Emulsions concentrated in highly viscous hydrophobic compounds are also used in the adhesives industry via bonding agents made with emulsion based on colophony esters. For their part, emulsions concentrated in viscous hydrophilic compound(s) are more particularly used in the pharmaceutical and food industries.

However, the techniques available at the present time for preparing emulsions of this type in most cases require high temperatures, high pressures and/or high shear rates.

Thus, if we consider the specific case of bitumen, the corresponding emulsions are currently prepared by hot injection. In general, the bitumen is heated to a temperature above 120° C. and the continuous phase, generally water, is heated to about 60° C. The mixture of bitumen and the aqueous phase is injected into a turbomixer with a very high stirring speed, of about 5000 rpm, and under a pressure which can be up to 3 atmospheres. After such a treatment, bitumen emulsions having a bitumen concentration not exceeding 70% by weight of bitumen, a large average droplet size (typically greater than 5 microns) and a polydispersity which is also large are generally obtained.

This type of process thus has several drawbacks.

In particular, conventional processes do not make it possible to prepare emulsions with a bitumen concentration of more than 70%. However, certain specific applications require, as regards the handling of the emulsions, emulsions with bitumen concentrations of more than 90%. This is the case, for example, for the mastics used for leakproofing work (protection of buildings, pipelines and the undercarriage of cars).

Finally, the bitumen emulsions currently available are not satisfactory in terms of monodispersity. The size of the bitumen droplets present in these emulsions is generally greater than 5 microns and very heterogeneous. The stability on storage and the breaking of this type of emulsion are found to be difficult to control and the surfacings resulting therefrom are not sufficiently homogeneous. It is clear that this can be detrimental as regards the use of the emulsions and the final mechanical quality of the corresponding surfacings.

One subject of the present invention (is, specifically, to propose a process for preparing emulsions which are concentrated in a highly viscous phase such as bitumen and are also calibrated.

In particular, the invention is based on the demonstration that the direct mixing of a highly viscous phase, i.e. a phase which has a viscosity of between 1 and 5000 Pa.s at the time of emulsification, with a phase which is immiscible therewith, in the presence of a surfactant, leads, under low shear and in a very short space of time, to a viscoelastic paste which is advantageously found to have the specificities of an emulsion.

More specifically, the emulsification method according to the invention is novel in that it makes it possible to manufacture highly concentrated emulsions of "water-in-oil" or "oil-in-water" type by directly mixing together the two phases in a laminar shear regime. It thus differs clearly from conventional emulsification processes, such as the one mentioned above, which operate in a turbulent regime. It also differs from the conventional techniques of emulsification in a laminar regime which proceed by gradual incorporation of a first phase to be emulsified into a second phase, or vice versa.

A first subject of the present invention is thus a process which is useful for emulsifying a first hydrophobic or hydrophilic phase with a viscosity of between 1 and 5000 Pa.s or more with a second phase which is immiscible with the said first phase, characterized in that it involves:

- where necessary, a pretreatment of the said first phase to be emulsified so as to adjust its viscosity to a value of less than 5000 Pa.s,
- the addition, in a single portion, of the said phase to a second phase which is immiscible with the said first phase, in the presence of at least one surfactant, and
- mixing them together under a laminar shear regime until a stable emulsion is obtained in which the said first phase is present in a proportion of from 75 to 95% by weight.

The emulsion obtained after the process claimed has the appearance of a viscoelastic paste. Advantageously, it is found to be redispersible despite a high concentration of one of its phases. It can thus be diluted so as to adapt the concentration of the final emulsion to the requirements of the application envisaged.

Besides a high concentration of one of its phases, the emulsion obtained according to the invention has a very narrow particle-size distribution and the average diameter of its droplets can be readily controlled by means of the shear rate or by means of the formulation parameters and more particularly the concentration of the second phase, also known as the diluent phase.

In this regard, a subject of the present invention is also a process which is useful for preparing an emulsion with a concentrated and calibrated hydrophobic or hydrophilic phase and with a viscosity of between 1 and 5000 Pa.s or more, comprising

- where necessary, a pretreatment of the said phase to be emulsified so as to adjust its viscosity to a value of less than 5000 Pa.s,
- the addition, in a single portion, of the said phase to a second phase, which is immiscible with the said first phase, in the presence of at least one surfactant, and
- mixing them together under a laminar shear regime until a stable emulsion is obtained in which the said first phase is present in a proportion of from 75 to 95% by weight, characterized in that the size of the droplets in the said first phase is controlled in the said emulsion by adjusting the concentration in the second phase for a given shear rate and a given surfactant concentration.

As a general rule, the size of the droplets in the first phase decreases when the shear rate and/or the concentration of surfactant increase. The inventors have thus demonstrated, unexpectedly, that it is possible to adjust the size of the droplets in the first phase by controlling the amount of the second phase introduced to prepare the emulsion. The size of the droplets does not change monotonically with the amount of the second phase: the size first decreases and then increases when the amount of the second phase increases.

According to this specific mode of the invention, it is thus found to be possible to obtain an emulsion with a minimum average droplet diameter, i.e. about 2 microns or even less, for an optimum amount of this second phase. The assessment of this critical volume of the second phase in fact depends on the chemical nature of the said first viscous phase to be emulsified. For a given amount of the first phase to be emulsified, the change (for a fixed stirring speed) of the average diameter of the droplets, obtained during its emulsification, is established for variable amounts of second phase. The critical volume is the volume for which the diameter of the droplets is a minimum. Needless to say, this assessment of the critical volume is made for a given shear rate and a given surfactant concentration.

Preferably, the emulsion has an average droplet diameter of less than 2 microns, i.e. a relatively smaller size than that obtained according to conventional emulsification processes. As regards the polydispersity, it is less than 40%, as compared with, for example, more than 100% for conventional bitumen emulsions. This polydispersity is expressed according to the Laser Coulter LS 230 granulometer and corresponds to the standard deviation of the distribution divided by the average diameter obtained (Coulter LS 230 documentation, page B-5).

The shear applied to the mixture is a laminar shear and is thus adjusted such that the stirring spindle rotates at low speed. This regime is characterized in that it has a low Reynolds number.

In fluid mechanics, the flow regimes are generally characterized with reference to a dimensionless number known as the Reynolds number, which is defined by $Re=\rho vL/\eta$, in which $\rho$ is the average density, $v$ is the flow rate, which can be likened in the case of the present invention to the speed of the stirring spindle, L is a characteristic length which can be likened in the process claimed to the gap between the stirring spindle and the wall of the reactor, and $\eta$ is the average viscosity of the emulsion.

For the purposes of the invention, the laminar regime is characterized in that it has a low Reynolds number, of less than about 1000. Beyond this value, the regime becomes turbulent.

As an illustration, if values of $\rho$ of 1000 kg/m$^3$, $v$ of 0.3 ms$^{-1}$ (circumferential speed of a spindle with a radius of 5 cm rotating at a speed of 500 rpm), L of 0.002 m and $\eta$ of 10 Pa.s (characteristic viscosity, at the shear rate applied, of an emulsion in which one of the phases is present in a proportion of 90% by weight) are considered in the process claimed, this gives a Reynolds number Re of 0.06, which clearly shows that the shear regime applied to the emulsions is laminar.

In the case of a conventional process carried out in an industrial reactor, using values of $\rho$ of 1000 kg/m$^3$, $v$ of 30 ms$^{-1}$ (circumferential speed of a cylinder with a radius of 0.5 m rotating at a speed of 5000 rpm), L of 0.001 m and $\eta$ of $10^{-2}$ Pa.s (characteristic viscosity, at the shear rate applied, of an emulsion in which one of the phases is present in a proportion of 60% by weight), then a Reynolds number Re of 3000 is instead found, corresponding to a turbulent regime.

Preferably, the stirring speed ranges between 100 and 1000 rpm (corresponding to a shear rate of between about 250 and 2500 s$^{-1}$) and is more preferably from about 400 to 500 rpm (corresponding to a shear rate of about 1000 s$^{-1}$). It is adapted so as to convert very rapidly, i.e. within a period of a few seconds to a few tens of seconds, the mixture into the expected emulsion.

To this end, the stirring system is chosen so as to ensure both homogenization and shear of the mixture. Thus, stirrers such as flexible grates, propellers or paddle stirrers are particularly suitable in the context of the present invention.

Preferably, the emulsification is carried out at ambient temperature and pressure. However, certain compounds whose viscosity is greater than 5000 Pa.s should preferably be treated by heating so as to reduce their viscosity. In order to avoid boiling of the second phase, under the effect of the heat supplied by the preheated viscous first phase, it may be necessary to work at a pressure above atmospheric pressure. The optimum temperature and pressure conditions will be determined by a person skilled in the art by means of simple routine operations.

For the purposes of the invention, the said first hydrophobic or hydrophilic phase is or comprises at least one hydrophobic or hydrophilic compound. For example, it may comprise a mixture of several compounds of either hydrophilic or hydrophobic nature and in diluted or undiluted form.

This hydrophobic or hydrophilic phase is characterized in all cases by a very high viscosity, from about 1 to 5000 Pa.s or more. It has the appearance of a highly viscous fluid, and is thus particularly difficult to emulsify.

As an illustration of compounds which can be dispersed according to the invention, mention may be made most particularly of hydrophobic materials such as, in particular, colophony esters (adhesives industry), lanolin (cosmetics), bitumens, waxes (cosmetics, cleaning products, etc.), polybutadienes of low molecular mass, or hydrophilic compounds such as, in particular, polyethylene glycols, sugars, gelatins (agar-agar, carrageenans, etc.) (pharmaceutical and food industries) and mixtures thereof.

Since some of the corresponding hydrophobic or hydrophilic phases have a high viscosity at room temperature, in particular of greater than 5000 Pa.s, it is found to be necessary to lower their viscosity to a value below 5000 Pa.s in order to give them beforehand a fluidity which is suitable for their subsequent mixing with the said second phase. As explained above, the said first phase can then be subjected to a pretreatment which preferably consists of a heating operation combined, where necessary, with mechanical stirring (faster homogenization of the temperature in the viscous phase). In point of fact, this heating is found to be more particularly necessary when the said first phase has a viscosity at room temperature such that its flow and/or pumping is impeded. In this regard, any destabilization of the emulsion obtained, liable to be brought about by the evaporation of the second phase, should be prevented. In this specific case, the viscoelastic paste obtained may be diluted in the hours following its preparation and preferably immediately after it has been prepared, so as to limit the instabilities (coalescence) which may result from the evaporation.

As regards the second phase, it can be either aqueous or oily. When it is an oil, this oil can be, without preference, a mineral, plant or animal oil. Mineral oils which may be proposed in particular are paraffinic oils and naphthenic oils or mixtures thereof.

The surfactants used according to the invention can be chosen from any category of surfactant (anionic, cationic, nonionic, amphoteric, etc. surfactants). They can be chosen from the surfactants conventionally used in processes for emulsifying the said first phase under consideration. Needless to say, they are selected taking into account the type of emulsion, viscous hydrophobic phase in aqueous phase or viscous hydrophilic phase in oily phase, which it is envisaged to prepare according to the invention. Thus, in order to obtain emulsions of water-in-oil type, surfactants with a hydrophilic/lipophilic balance (HLB) of less than 7 are selected, and for emulsions of oil-in-water type, surfactants with an HLB of greater than 14 are selected.

The term "HLB" (Hydrophilic-Lipophilic Balance) denotes the ratio of the hydrophilicity of the polar groups of the surfactant molecules to the hydrophobicity of the lipophilic part of these same molecules; this is a term commonly used in the surfactants field (see the treatise "Techniques de l'Ingénieur [Engineering Techniques]", chapter A7610: "Les agents de surface [Surfactants]").

Advantageously, care will be taken to predissolve the surfactants in the second phase in order to avoid any problems of dissolution kinetics. The surfactants are used in the process according to the invention in a reduced amount preferably ranging between 0.5% and 5% by weight expressed relative to the weight of the said first hydrophobic or hydrophilic phase to be emulsified, so as to extract the maximum value from the amount of surfactant. The surfactant yield is defined as being the ratio of the amount of surfactant required to cover the dispersed droplets to the total amount of surfactant used.

The process according to the invention is most particularly useful for preparing aqueous bitumen emulsions.

Thus, starting with 100 grams of bitumen and for a water concentration of 5 grams per 100 grams of bitumen, highly concentrated emulsions, i.e. containing 95% by weight of bitumen, which can be diluted and which are stable on storage can be prepared.

As mentioned above, the viscoelastic paste obtained may be diluted with hot water (60° C.) in the hours following its preparation, and preferably immediately after it has been prepared. Emulsions having, after dilution, a bitumen concentration of between 75% and 85% are found to be particularly stable for at least several months.

The introduction of a surfactant such as, in particular, tetradecyltrimethylammonium bromide in a proportion of 1.5 grams per 100 grams of bitumen also allows the size of the droplets in the emulsion to be reduced to a value in the region of 1 micron.

One specific embodiment of the invention is thus directed towards the use of the process claimed for the preparation of a concentrated and calibrated bitumen emulsion. This process comprises the steps consisting in heating bitumen to a temperature of 95° C., mixing it, in a reactor and at atmospheric pressure, with 5% by weight of water and 0.5% to 1.5% by weight of a surfactant relative to the weight of the bitumen, and applying a shear rate to the said mixture thus obtained so as to form the said emulsion, which is recovered.

As regards the stirring speed, this can range between 0 and 1000 rpm and is preferably from about 400 to 500 rpm, which corresponds to a shear rate of about 1000 $s^{-1}$. A concentrated bitumen emulsion is obtained very quickly, i.e. in a few seconds, under the effect of this shear. This emulsion has the appearance of a non-emulsified viscoelastic paste. An examination of this emulsion shows that it has a bitumen concentration which can be up to 90 or even 95% by weight. Advantageously, this paste is found to be fully redispersible in water despite its high bitumen concentration.

A subject of the present invention is also bitumen emulsions, characterized in that they have a bitumen concentration of greater than 75% and preferably at least equal to 85% by weight of bitumen.

Preferably, the bitumen emulsions claimed and obtained according to the process of the invention have a polydispersity of about 40%. They consist of droplets with an average diameter of less than or about 2 microns, and preferably less than 1 micron.

It is clear that the process according to the invention, and likewise the emulsions thus obtained, are particularly advantageous in the road industry. The process claimed makes it possible to prepare highly concentrated fine bitumen emulsions with very good control of the final size of their droplets, by a fast, simple protocol with a small amount of surfactants.

The present invention also extends to emulsions of hydrophobic or hydrophilic phase, obtained according to the process claimed. It is thus found to be most particularly useful for preparing concentrated and calibrated emulsions of therapeutic, cosmetic or food-use interest.

The examples and figures given below, without any limitation of the present invention, demonstrate other advantages thereof.

EXAMPLE 1

Protocol for Preparing an Aqueous Bitumen Emulsion According to the Invention 100 grams of bitumen with a penetration index of 90/100* are heated to a temperature of about 100° C. An aqueous tetradecyltrimethylammonium bromide (TTAB) solution of variable concentration is prepared. The heated bitumen is poured onto the aqueous solution and the mixture is blended for a few seconds using a flexible grate, at 400 rpm (1000 $s^{-1}$) in a reactor 10 centimetres in diameter. The emulsion obtained almost instantaneously is characterized in terms of droplet diameter.

*The penetration index is a parameter used in the road industry to characterize the "hardness" of a bitumen at 25° C. The process for measuring the penetration index is governed by ASTM (American Society for Testing and Materials) standard D5-86.

A commercial Laser Coulter LS 230 granulometer (from the company Coultronics) is used to measure the diameter of the droplets.

EXAMPLE 2

Figure 1:
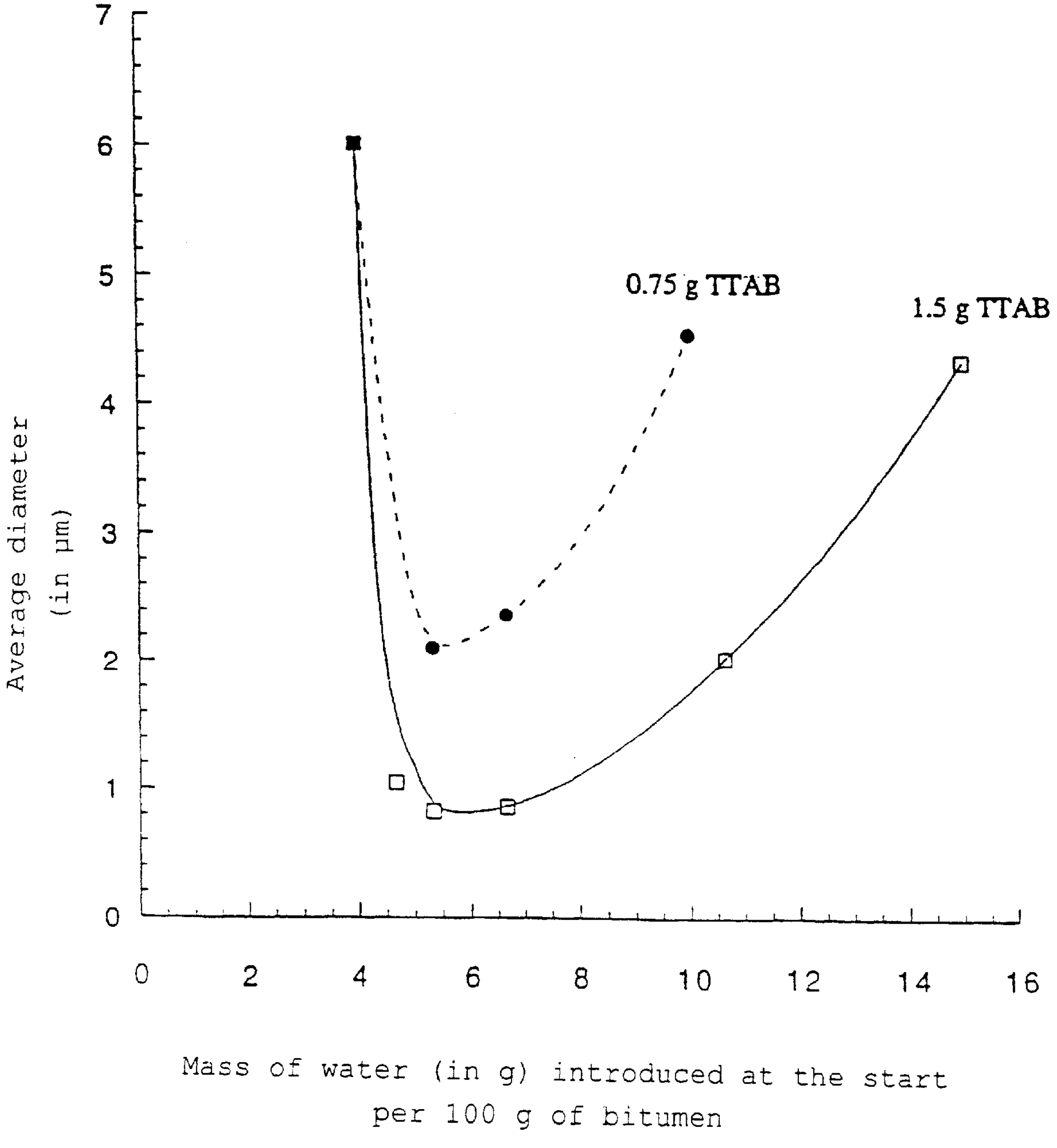
FIG. 1: Graph representing the change in the average diameter of the droplets obtained for a stirring speed of about 400 rpm (shear rate of about 1000 $s^{-1}$) as a function of the amounts of water and surfactant (TTAB) present at the start.

Effect of the Amount of Water and of Surfactant (TTAB) on the Average Diameter of the Droplets in a Bitumen Emulsion at Constant Shear The protocol described in Example 1 is repeated for two TTAB concentrations, 0.75 grams and 1.5 grams, and in the presence of an amount of water ranging between 4 and 14 grams for each of these concentrations. The emulsions obtained after each of the tests are characterized by the average diameter of their droplets. The results are given on the graph in FIG. 1.

The finest emulsion is obtained for a constant amount of water of about 5 grams per 100 grams of bitumen. The minimum droplet size thus obtained can also be reduced by increasing the amount of surfactant. Thus, for 1.5 grams of TTAB in 5.5 grams of water, the minimum diameter is reduced to 0.8 microns, as against 2 microns with 0.75 grams of TTAB.

EXAMPLE 3

Figure 2:
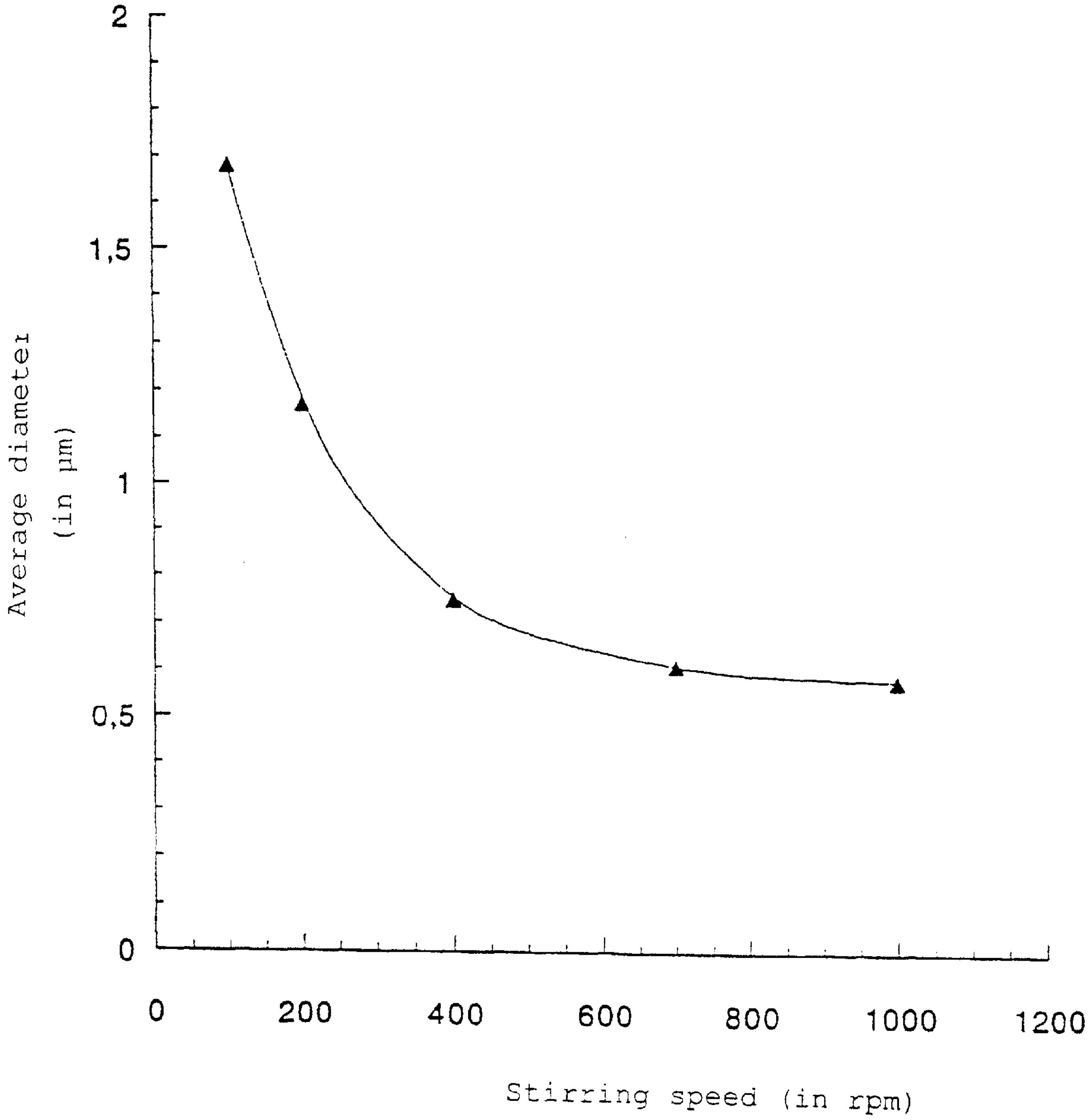
FIG. 2: Graph representing the change in the average diameter of droplets prepared according to Example 3 as a function of the shear rate applied during the emulsification.

Effect of the Shear Rate on the Average Diameter of the Droplets in the Emulsified Viscous Phase The protocol described in Example 1 is repeated with 100 g of bitumen, 1.5 g of TTAB and 5.5 g of water for variable stirring speeds. The emulsions obtained after each of the tests are characterized by the average diameter of their droplets. The results are represented on the graph in FIG. 2. It is thus observed that a high shear rate promotes the formation of droplets of markedly smaller average diameter. However, the stirring speed should not exceed a threshold value of 1000 rpm (about 2500 $s^{-1}$), above which the excessively violent shear destroys the concentrated emulsion.

EXAMPLE 4

Figure 3:
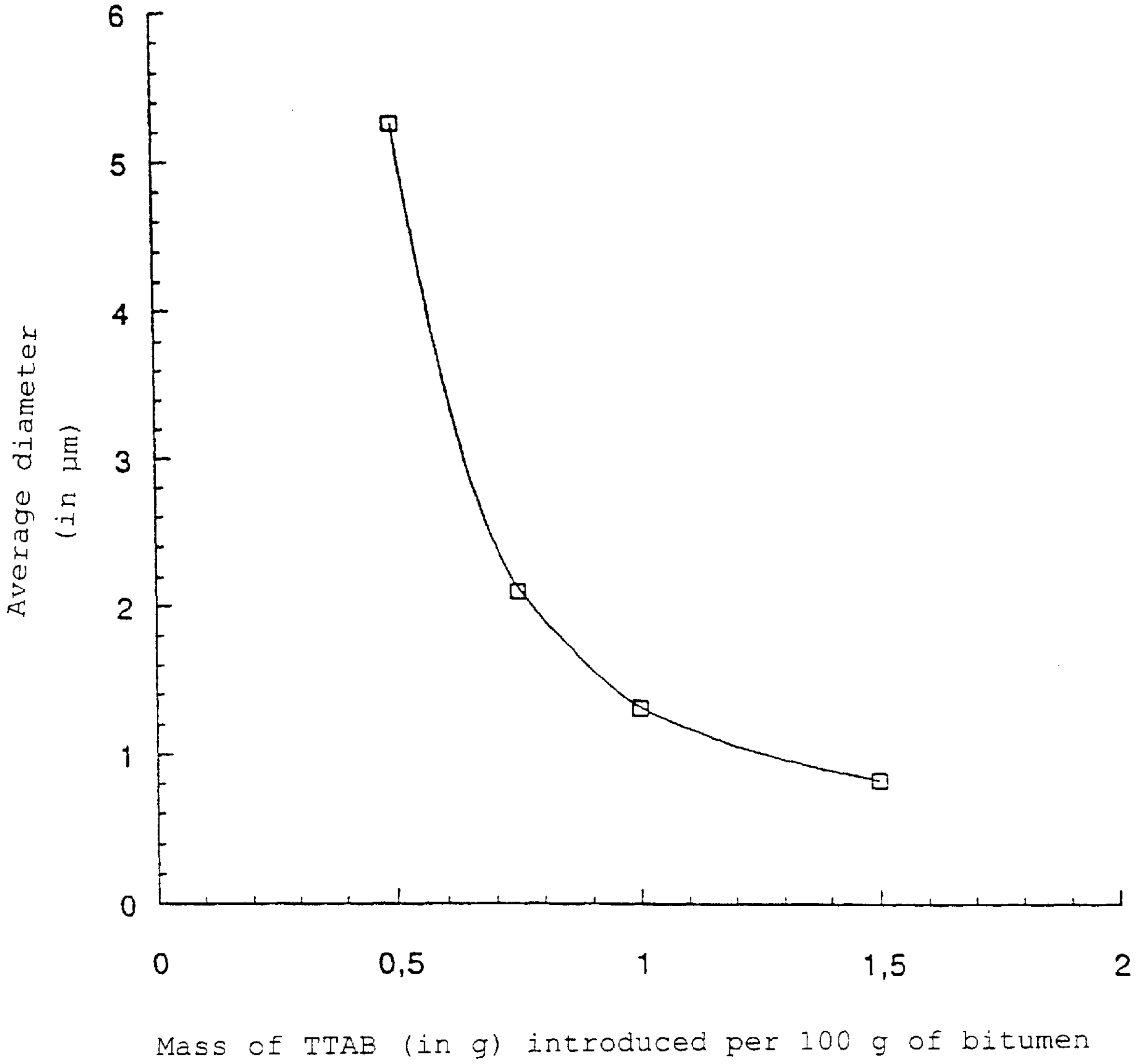
FIG. 3: Graph representing the change in the average diameter of the droplets obtained for a stirring speed of about 400 rpm (shear rate of about 1000 $s^{-1}$) as a function of the amount of TTAB.

Effect of the Amount of Cationic Surfactant on the Average Diameter of the Droplets of a Bitumen Emulsion with a Constant Volume of Water and at Constant Shear The protocol described in Example 1 is repeated for different TTAB concentrations, in the presence of 5.5 grams of water. The results obtained are represented on the graph in FIG. 3.

It is noted that 1 gram of TTAB per 100 grams of bitumen is sufficient to achieve sizes of the order of one micron.

Figure 4:
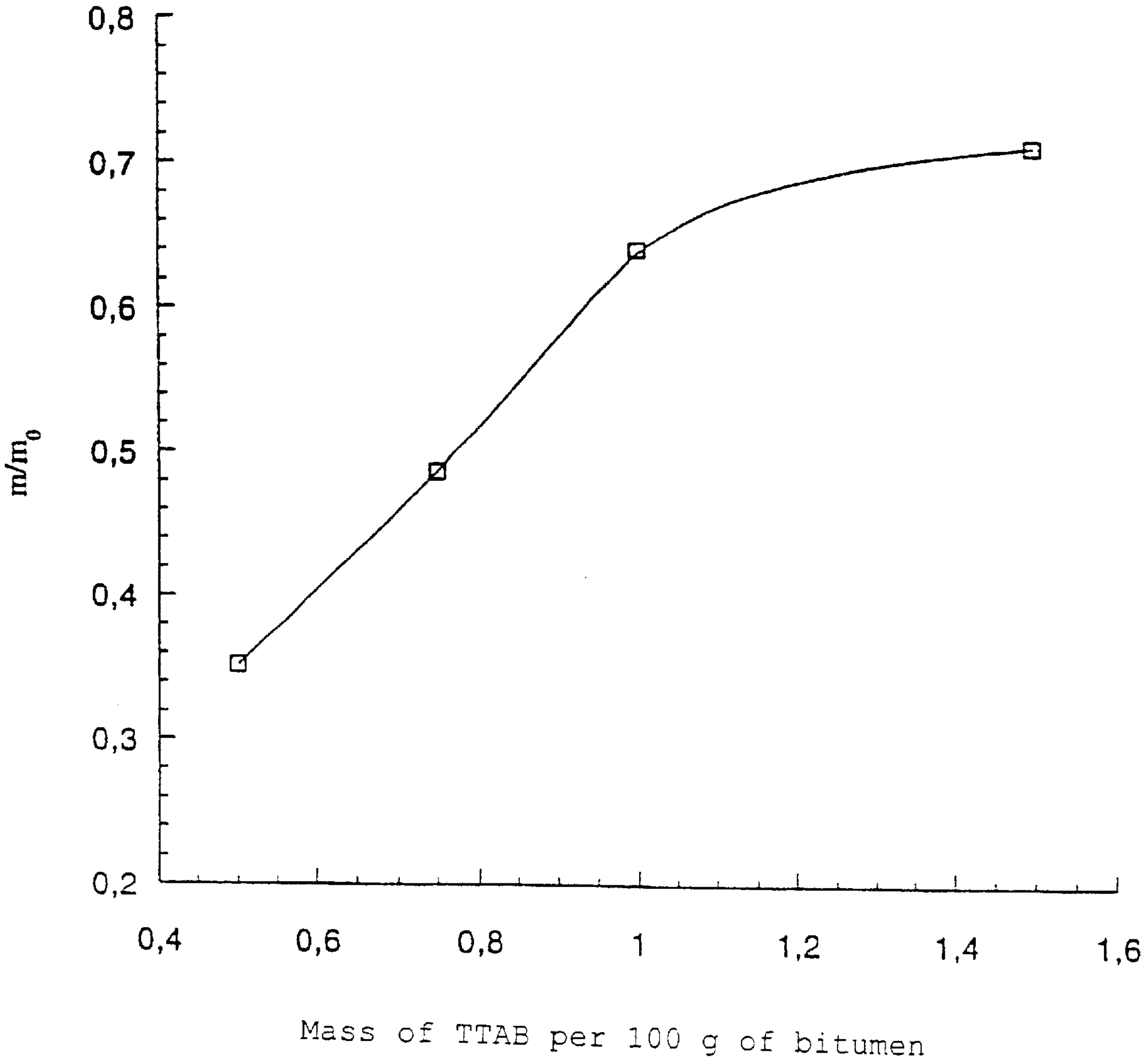
FIG. 4: Graph of efficacy of the emulsification obtained for a stirring speed of about 400 rpm (shear rate of about 1000 $s^{-1}$), mass of TTAB used/mass introduced.

A characterization of the yield for the processes as a function of the mass of TTAB introduced shows in fact that the maximum efficacy is virtually achieved for this maximum amount of TTAB. More specifically, this result is obtained by taking the yield as being the ratio of the mass of surfactants present at the interfaces, to the total mass of surfactants introduced. The mass of surfactants present at the interfaces is determined simply by measuring the residual amount of surfactants present in the second phase after a controlled dilution. The graph in FIG. 4 represents this ratio as a function of the total mass introduced into the 5.5 grams of water required to emulsify 100 grams of bitumen.

EXAMPLE 5

Assessment of the Optimal Amount of Second Phase Relative to the Average Diameter of the Droplets of an Emulsion In this example, the viscous hydrophilic phase to be dispersed is an aqueous mixture containing 44% polyethylene glycol PEG 35000, the surfactant is Span 80® (sorbitan monooleate sold by Sigma), present in a proportion of 1.5 g per 100 g of the phase to be dispersed, and the continuous phase is dodecane.

Several mixtures of these compounds are prepared for different amounts of dodecane at a shear of 400 rpm (1000 $s^{-1}$) (the apparatus is the same as that used for the manufacture of the bitumen emulsions) in a reactor. The emulsions, obtained almost instantaneously, are characterized by the average diameter of their droplets. The results are given on the graph in FIG. 5. The photograph given in FIG. 6 is a microscope photograph of one of these emulsions.

Figure 5:
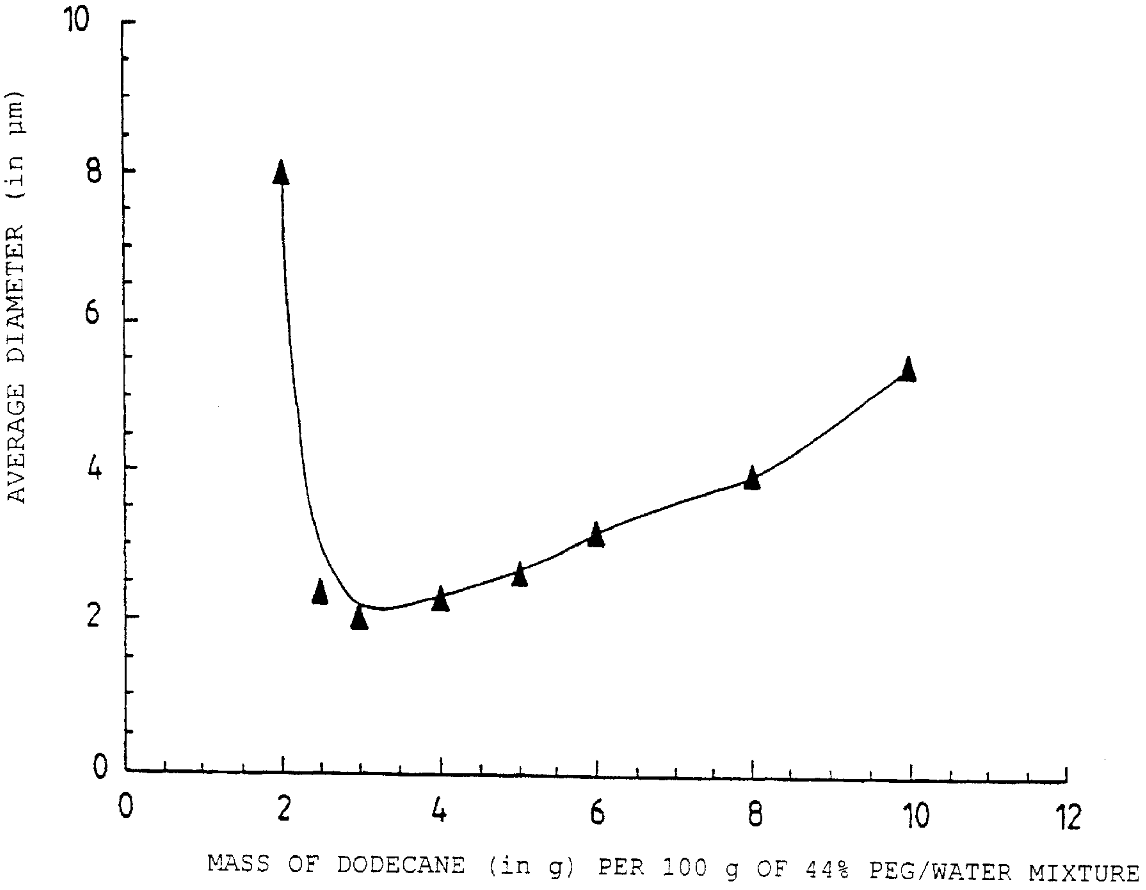
FIG. 5: Graph representing the change in the average diameter of the droplets as a function of the amounts of oil, for an emulsification carried out according to Example 5.
Figure 6:
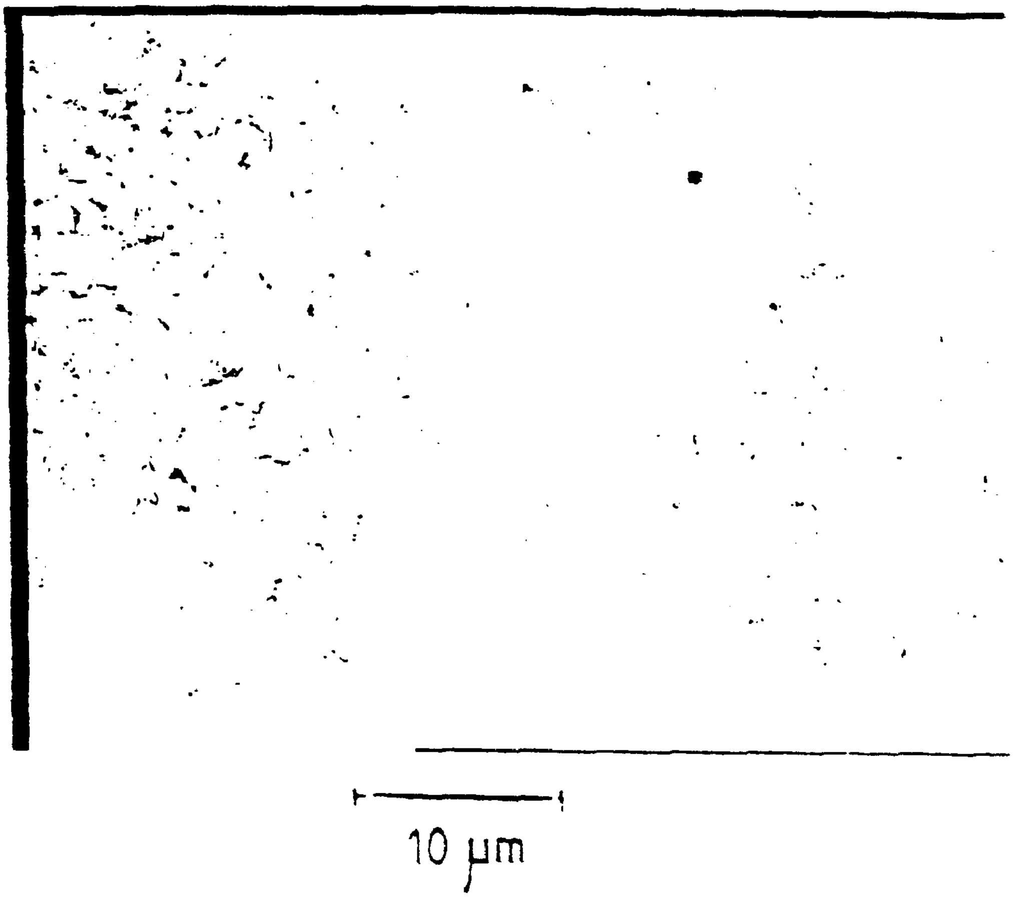
FIG. 6: Microscope photograph of a PEG emulsion obtained according to Example 5.

It is seen on the graph in FIG. 5 that the minimum diameter, i.e. about 2 microns, is obtained for 3 g of dodecane.

EXAMPLE 6

Figure 7:
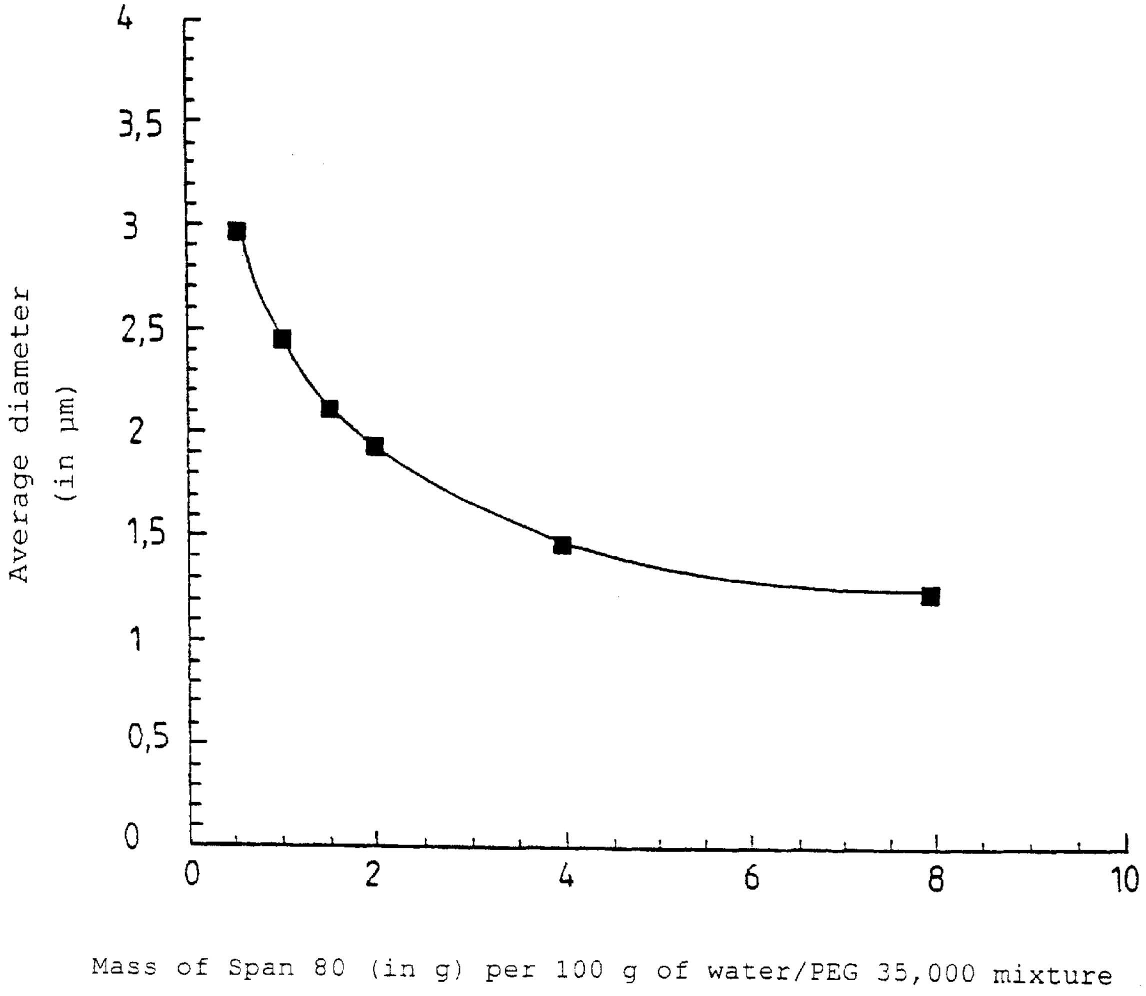
FIG. 7: Graph representing the change in the average diameter of the droplets as a function of the amount of Span 80® or an emulsion prepared according to Example 5.

Effect of the Amount of Surfactant on the Average Diameter of the Droplets of an Emulsion at Constant Shear The protocol described in Example 5 is reproduced for several concentrations of Span 80® surfactant and 3 g of dodecane. The emulsions obtained after each of the tests are characterized by the average diameter of their droplets. The results are represented on the graph in FIG. 7.

The finest emulsion is obtained for 4 g of Span 80®.

EXAMPLE 7

Comparison of a Bitumen Emulsion According to the Invention and of a Conventional Emulsion in Terms of Polydispersity and Average Droplet Diameter The industrial technique used consists in injecting, under pressure (about 1.5 atmospheres) and at 130° C., bitumen, on the one hand, and the aqueous soapy phase, on the other hand, between two coaxial rollers (a rotor and a stator) spaced about 1 mm apart. The rotor rotates at a speed of about 5000 rpm. The emulsification takes place directly in the 1 mm gap, and does so in a turbulent regime. The fraction by volume of the phase to be dispersed cannot exceed 70% or else it will block the system.

This assessment is carried out using an emulsion obtained in accordance with the present invention and incorporating 0.75 grams of TTAB per 5.5 grams of water and 100 grams of bitumen and of a conventional industrial bitumen emulsion. This industrial emulsion contains 60 grams of bitumen, 0.5 gram of cationic surfactant and 39.5 g of water.

Figure 8:
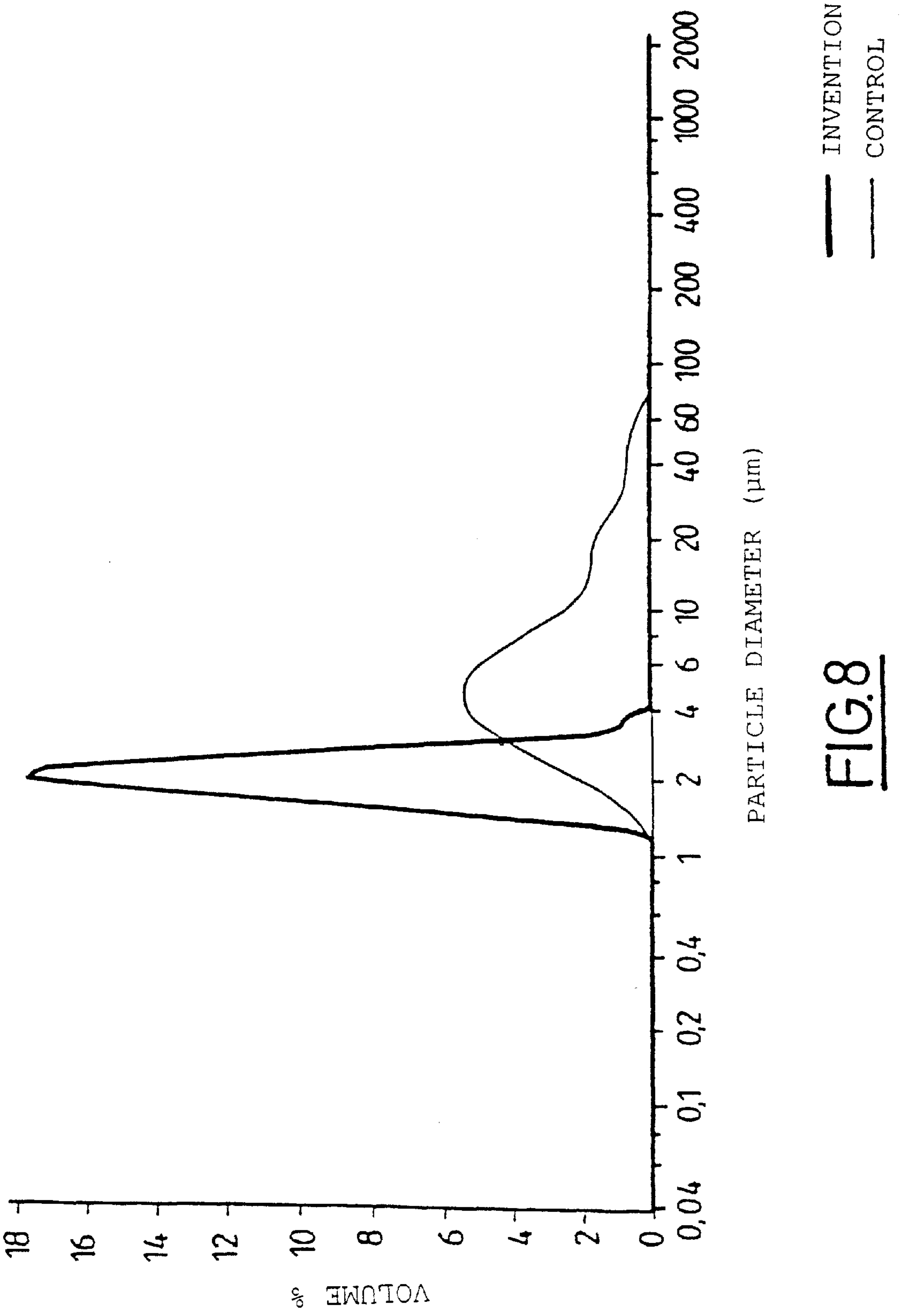
FIG. 8: Comparison in terms of polydispersity of an emulsion according to the invention and of a control emulsion (Example 7).

The granulometric distributions obtained by the two techniques are presented in FIG. 8.

For the emulsion according to the invention, an average size centred at about 2 microns is observed, with a polydispersity in the region of 30%. In turn, the control emulsion has a markedly larger average droplet diameter, i.e. 5 microns, and a polydispersity not in accordance with the invention, i.e. markedly greater than 40%.

What is claimed is:

1. Process for emulsifying a first hydrophobic or hydrophilic phase having a viscosity between 1 and 5000 Pa.s with a second phase immiscible in the first phase, comprising:

combining the first phase in a single portion with the second phase, and at least one surfactant, and mixing the first phase, second phase, and surfactant together under a laminar shear regime to obtain a stable emulsion having an average droplet diameter less than 2 microns and a polydispersity less than 40%, the first phase being present in a proportion of 75 to 95% by weight.

2. Process according to claim 1, characterized in that the first phase is obtained by adjusting phase viscosity from more than 5000 Pa.s. to less than 5000 Pa.s.

3. Processing according to claim 1, characterized in that the second phase is present in an amount such that the average droplet diameter of the emulsion is less than. or equal to 1 micron.

4. Process according to claim 1, characterized in that the surfactant is present in an amount between 0.5% and 5% by weight, relative to the weight of the first phase.

5. Process according to claim 1, characterized in that the first phase comprises at least one compound selected from the group consisting of bitumens, colophony esters, polybutadienes of low molecular mass, waxes, lanolin, sugars, polyethylene glycols, gelatins, and mixtures thereof.

6. Process according to claim 1, characterized in that the laminar shear regime has a Reynolds number less than 1000.

7. Process according to claim 1, characterized in that laminar shear regime has a shear rate ranging between 250 and 2500 $s^{-1}$.

8. Process according to claim 1, wherein the shear rate is about 1000 $s^{-1}$.

9. Process according to claim 1, characterized in that the first phase is a bitumen phase and the second phase is water.

10. Process for preparing a concentrated and calibrated emulsion using a hydrophobic or hydrophilic phase having a viscosity between 1 and 5000 Pa.s, comprising:

combining, in a single portion as a first phase, the hydrophobic or hydrophilic phase having a viscosity less than 5000 Pa.s with a second phase immiscible in the first phase, and at least one surfactant and mixing the first phase, second phase, and surfactant together under a laminar shear regime, having a shear rate, to obtain a stable emulsion having an average droplet diameter less than 2 microns and a polydispersity less than 40%, the first phase being present in a proportion of 75 to 95% by weight, wherein the average droplet diameter less than 2 microns is obtained by adjusting the concentration of the second phase based on the shear rate and surfactant concentration.

11. Process according to claim 10, characterized in that the hydrophobic or hydrophilic phase is obtained by adjusting phase viscosity from more than 5000 Pa.s to less than 5000 Pa.s.

12. Process according to claim 10, characterized in that the second phase is present in an amount such that the average droplet diameter of the emulsion is less than or equal to 1 micron.

13. Process according to claim 10, characterized that the surfactant is present in an amount between 0.5% and 5% by weight, relative to the weight of the first phase.

14. Process according to claim 10, characterized in that the first phase comprises at least one compound selected from the group consisting of bitumens, colophony esters, polybutadienes of low molecular mass, waxes, lanolin, sugars, polyethylene glycols, gelatins, and mixtures thereof.

15. Process according to claim 10, characterized in that the laminar shear regime has a Reynolds number less than about 1000.

16. Process according to claim 10, characterized in that the laminar shear regime has a shear rate ranging between 250 and 2500 $s^{-1}$.

17. Process according to claim 16, wherein the shear rate is about 1000 $s^{-1}$.

18. Process according to claim 10, characterized in that the first phase is a bitumen phase and the second phase is water.

19. Process according to claim 10, wherein the concentrated and calibrated emulsion is prepared as a concentrated and calibrated bitumen emulsion.

20. Process for preparing a calibrated and concentrated bitumen emulsion, comprising:

heating the bitumen to a temperature of 95° C., mixing, in a reactor under a laminar shear regime and at atmospheric pressure, the heated bitumen with water at 5% by weight relative to the weight of bitumen and a surfactant at 0.5 to 1.5% by weight relative to the weight of bitumen, to form a bitumen emulsion having a polydispersity of less than 40% and an average droplet diameter less than 2 microns.

21. Process according to claim 20, characterized in that the bitumen emulsion is at least 90% bitumen, by weight.

22. Process according to claim 21, wherein the bitumen emulsion is about 95% bitumen, by weight.

* * * * *